US009804486B2

(12) United States Patent
Akiyama

(10) Patent No.: US 9,804,486 B2
(45) Date of Patent: Oct. 31, 2017

(54) LIGHT SOURCE APPARATUS, ILLUMINATOR, AND PROJECTOR HAVING MULTIPLE REFLECTION ELEMENTS

(71) Applicant: SEIKO EPSON CORPORATION, Tokyo (JP)

(72) Inventor: Koichi Akiyama, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 15/052,143

(22) Filed: Feb. 24, 2016

(65) Prior Publication Data
US 2016/0259234 A1 Sep. 8, 2016

(30) Foreign Application Priority Data
Mar. 2, 2015 (JP) ................................. 2015-039845

(51) Int. Cl.
| G03B 21/20 | (2006.01) |
| F21V 7/00 | (2006.01) |
| F21V 7/04 | (2006.01) |
| G03B 21/00 | (2006.01) |

(52) U.S. Cl.
CPC .......... G03B 21/208 (2013.01); F21V 7/0033 (2013.01); F21V 7/04 (2013.01); G03B 21/006 (2013.01); G03B 21/204 (2013.01); G03B 21/2013 (2013.01); G03B 21/2066 (2013.01)

(58) Field of Classification Search
CPC ....... F21V 7/0033; F21V 7/04; G03B 21/006; G03B 21/2013; G03B 21/204; G03B 21/2066; G03B 21/208
See application file for complete search history.

(56) References Cited

U.S. PATENT DOCUMENTS

| 6,527,420 B1* | 3/2003 | Chuang .................... H04N 5/74 |
| | | 348/E5.137 |
| 2002/0114158 A1* | 8/2002 | Chuang ................. F21V 7/0025 |
| | | 362/243 |
| 2014/0111775 A1* | 4/2014 | Nishikawa ......... G03B 21/2013 |
| | | 353/31 |

FOREIGN PATENT DOCUMENTS

| JP | 2002-270005 A | 9/2002 |
| JP | 2010-060728 A | 3/2010 |
| JP | 2013-072901 A | 4/2013 |
| JP | 2013-114980 A | 6/2013 |
| JP | 2014-082144 A | 5/2014 |

* cited by examiner

*Primary Examiner* — Sultan Chowdhury
*Assistant Examiner* — Magda Cruz
(74) *Attorney, Agent, or Firm* — Oliff PLC

(57) ABSTRACT

A light source apparatus includes a first reflection element for receiving a first light beam from the first light source unit, a second reflection element for receiving a second light beam from the second light source unit, and third and fourth reflection elements. The third reflection element has a first curved section on which the first light beam reflected by the first reflection element is incident, and the fourth reflection element has a second curved section on which the second light beam reflected by the second reflection element is incident. The first curved section has a first optical axis that is located outside the third reflection element and shifted away from the third reflection element toward the fourth reflection element. The first light beam reflected by the first curved section is roughly parallel to the second light beam reflected by the second curved section.

20 Claims, 6 Drawing Sheets

LIGHT SOURCE APPARATUS, ILLUMINATOR, AND PROJECTOR HAVING MULTIPLE REFLECTION ELEMENTS

BACKGROUND

1. Technical Field

The present invention relates to a light source apparatus, an illuminator, and a projector.

2. Related Art

As a light source apparatus for a projector, there is a light source apparatus configured to cause light beams from a plurality of light sources to be reflected by a reflection member and a concave reflection surface and incident on a phosphor layer for reduction in size of the apparatus (see JP-A-2014-82144, for example). The structure described above, however, makes it difficult to uniformly illuminate the phosphor layer.

As a light source apparatus for a projector, there is also a known light source apparatus that uses a lens integrator to uniformly illuminate a phosphor layer with light beams from a plurality of light sources (see JP-A-2013-114980, for example).

To uniformly illuminate the phosphor layer, it is conceivable to combine the reflection member and the concave reflection surface in JP-A-2014-82144 described above with the lens integrator in JP-A-2013-114980 described above. In this case, since light incident on the lens integrator needs to be roughly parallelized light, the concave reflection surface is so designed that the reflection member and the concave reflection surface form a reduction-type afocal system.

In the present specification, a reduction-type afocal system is sometimes simply referred to as an afocal system. Further, a high afocal magnification configuration means a configuration for achieving a high light beam width compression factor in Comparative Example, which will be described later, and a low afocal magnification configuration means a configuration for achieving a low light beam width compression factor. The distance between a reflection element and a reflection element member in Comparative Example directly corresponds to the afocal magnification.

Assume that a reflection member and a concave reflection surface are used to form a reduction-type afocal system. When the afocal magnification is high, a light source unit needs to be implemented with high alignment precision. The afocal magnification therefore needs to be lowered to some extent in consideration of variation in the implementation of the light source unit and other factors. A low afocal magnification, however, does not allow a sufficiently narrow width of a light beam incident on the lens integrator, undesirably allowing no size reduction of the lens integrator and other optical elements provided on the downstream side of the afocal system.

SUMMARY

An advantage of some aspects of the invention is to provide a compact light source apparatus having a low afocal magnification but capable of narrowing a light beam. Another advantage of some aspects of the invention is to provide an illuminator including the light source apparatus and a projector including the illuminator.

A first aspect of the invention provides a light source apparatus including a first light source unit, a second light source unit, a first reflection element on which a first light beam outputted from the first light source unit is incident, a second reflection element on which a second light beam outputted from the second light source unit is incident, a third reflection element having a first curved section on which the first light beam reflected by the first reflection element is incident, and a fourth reflection element having a second curved section on which the second light beam reflected by the second reflection element is incident, wherein the first curved section has a first optical axis that is located outside the third reflection element and shifted away from the third reflection element toward the fourth reflection element, and the first light beam reflected by the first curved section is roughly parallel to the second light beam reflected by the second curved section.

The light source apparatus according to the first aspect outputs a combined light beam formed of the first light beam and the second light beam roughly parallel to each other. This means that the first reflection element, the second reflection element, the third reflection element, and the fourth reflection element form an afocal system. Further, the first curved section has a first optical axis that is located outside the third reflection element and shifted away from the third reflection element toward the fourth reflection element. This means that the first curved section has a structure in which a reflection surface that can form, along with the first reflection element and the second reflection element, an afocal system having a relatively small afocal magnification is halved along a plane containing the optical axis and an unnecessary section in the vicinity of the optical axis is removed from one of the halved members, and that the first reflection element and the third reflection element are shifted toward the second reflection element and the fourth reflection element.

According to the first aspect, since the first reflection element and the third reflection element are shifted toward the second reflection element and the fourth reflection element, the combined light beam can be narrowed by a factor greater than or equal to the afocal magnification.

Further, since an unnecessary section is removed from the reflection surface that forms the afocal system, and the first reflection element and the third reflection element are shifted toward the second reflection element and the fourth reflection element, the size of the light source apparatus is reduced.

In the first aspect, it is preferable that the first optical axis intersects the fourth reflection element.

According to the configuration described above, the third reflection element can be so disposed as to be close to the fourth reflection element. The combined light beam can therefore be further narrowed.

In the first aspect, it is preferable that the second curved section has a second optical axis that is located outside the fourth reflection element and shifted away from the fourth reflection element toward the third reflection element.

According to the configuration described above, since the second curved section has the same structure as that of the first curved section, the combined light beam can therefore be further narrowed.

In the first aspect, it is preferable that the second optical axis intersects the third reflection element.

According to the configuration described above, the fourth reflection element can be so disposed as to be close to the third reflection element. The combined light beam can therefore be further narrowed.

A second aspect of the invention provides an illuminator including the light source apparatus according to the first aspect, a wavelength conversion element, and a light guide system that guides at least part of the first light beam and the second light beam to the wavelength conversion element.

According to the second aspect, a compact illuminator can be provided.

A third aspect of the invention provides a projector including the illuminator according to the second aspect, a light modulator that modulates light outputted from the illuminator in accordance with image information to form image light, and a projection system that projects the image light.

According to the third aspect, a compact projector can be achieved.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
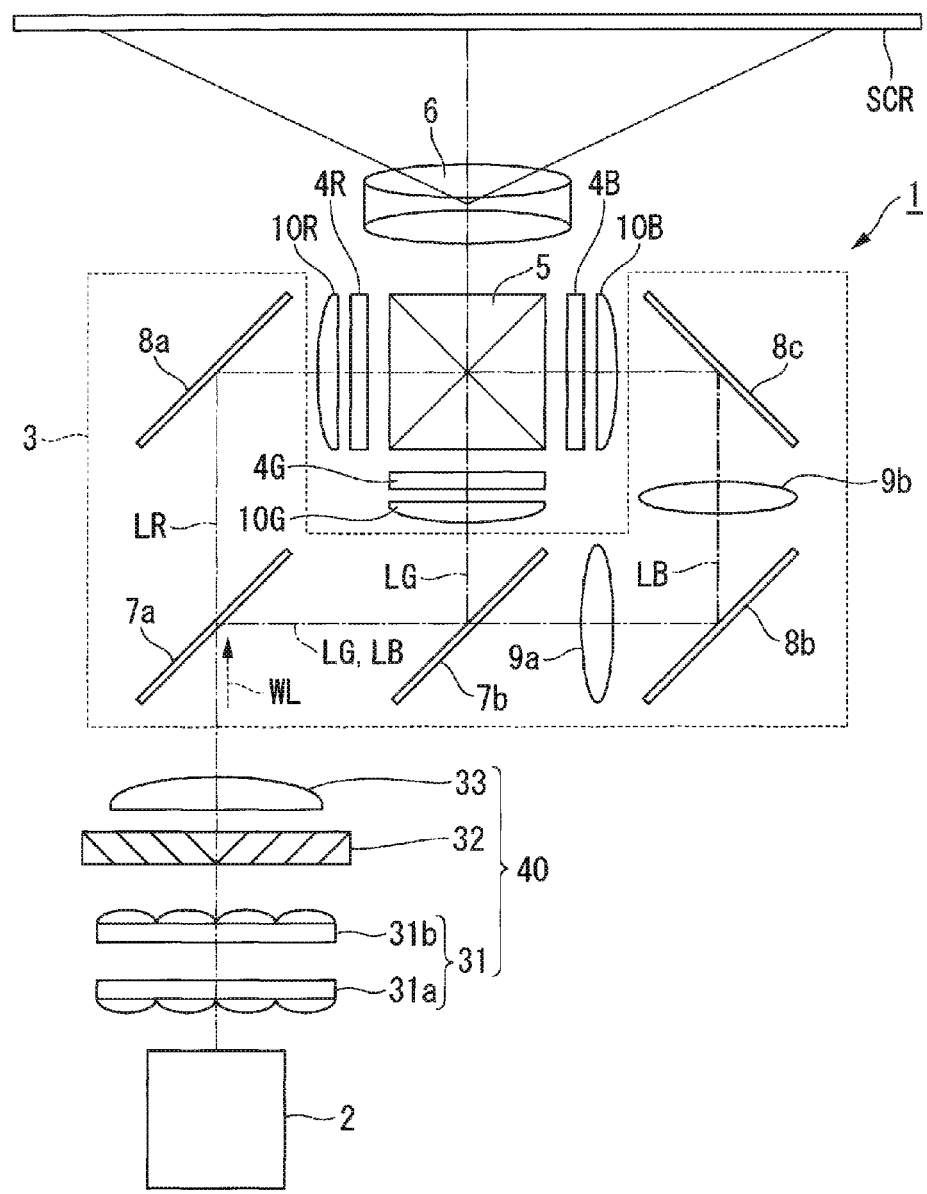
FIG. 1 is a schematic configuration diagram showing a projector according to an embodiment of the invention.

An embodiment of the invention will be described below in detail with reference to the drawings.

In the drawings used in the following description, a characteristic portion is enlarged for convenience in some cases for clarity of the characteristic thereof, and the dimension ratio and other factors of each component are therefore not always equal to actual values.

Projector

A projector according to the present embodiment is an example of a projector using three transmissive liquid crystal light valves.

Figure 2:
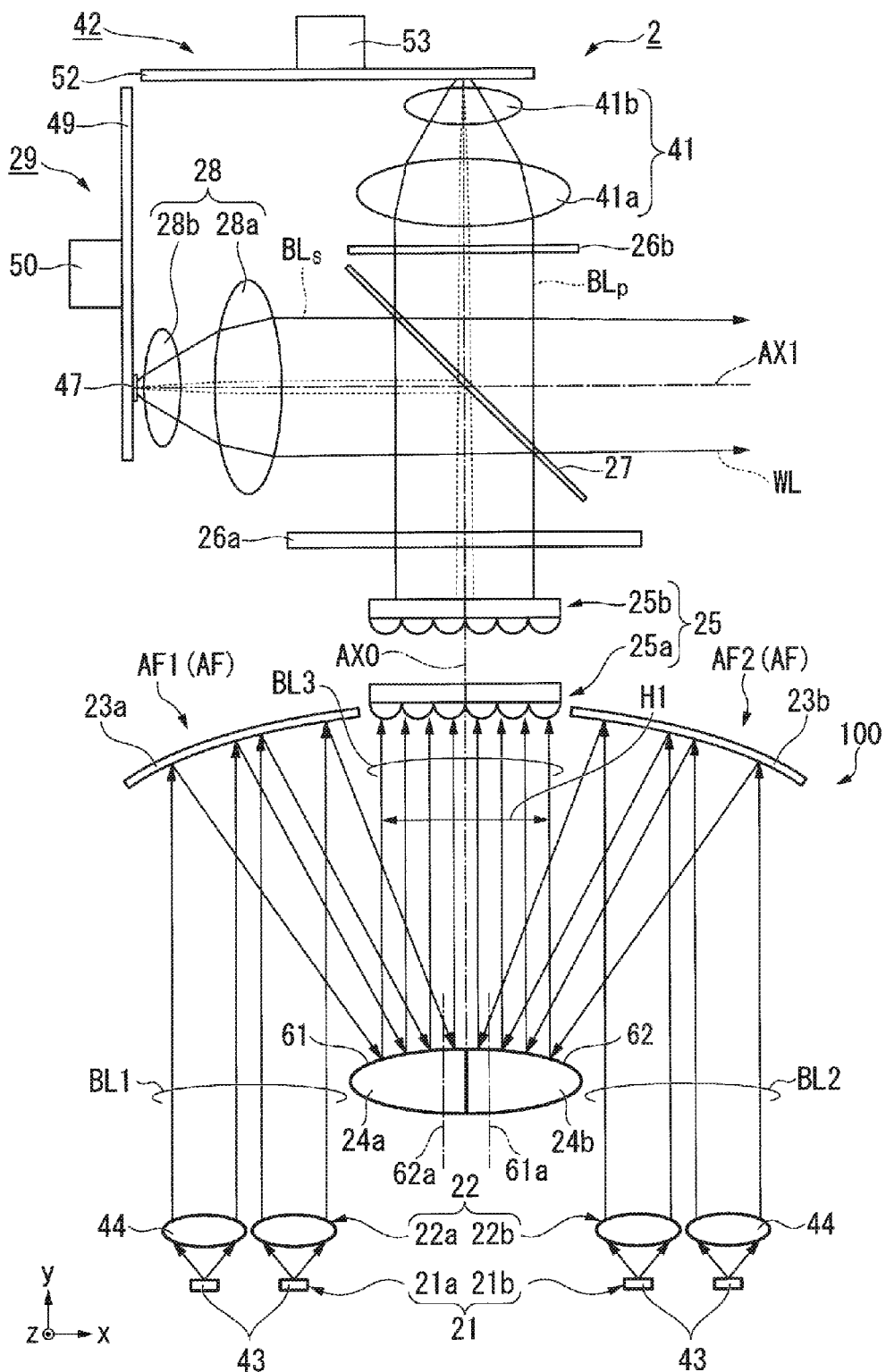
FIG. 2 is a schematic configuration diagram showing an illuminator according to the present embodiment.

FIG. 1 is a schematic configuration diagram showing the projector according to the present embodiment. FIG. 2 is a schematic configuration diagram showing an illuminator according to the present embodiment.

A projector 1 according to the present embodiment is a projection-type image display apparatus that displays a color image on a screen SCR, as shown in FIG. 1. The projector generally includes an illuminator 2, a homogenous illumination system 40, a color separation system 3, a light modulator 4R, a light modulator 4G, a light modulator 4B, a light combining system 5, and a projection system 6.

The illuminator 2 outputs white illumination light WL toward the homogenous illumination system 40. The illuminator 2 includes a light source apparatus according to an embodiment of the invention, which will be described later.

The homogenous illumination system 40 includes a homogenizer system 31, a polarization conversion element 32, and a superimposing system 33.

The homogenizer system 31 is formed of a first multiple lens array 31a and a second multiple lens array 31b.

The homogenous illumination system 40 homogenizes the intensity distribution of the illumination light WL outputted from the illuminator 2 in the light modulator 4R, the light modulator 4G, and the light modulator 4B, each of which is an illuminated area. The illumination light WL having exited out of the homogenous illumination system 40 is incident on the color separation system 3.

The color separation system 3 separates the illumination light WL outputted from the illuminator 2 into red light LR, green light LG, and blue light LB. The color separation system 3 includes a first dichroic mirror 7a, a second dichroic mirror 7b, a first reflection mirror 8a, a second reflection mirror 8b, a third reflection mirror 8c, a first relay lens 9a, and a second relay lens 9b.

The first dichroic mirror 7a has a function of separating the illumination light WL outputted from the illuminator 2 into the red light LR and light containing the green light LG and the blue light LB. The first dichroic mirror 7a transmits the red light LR and reflects the green light LG and the blue light LB. The second dichroic mirror 7b has a function of separating the light reflected by the first dichroic mirror 7a into the green light LG and the blue light LB. The second dichroic mirror 7b reflects the green light LG and transmits the blue light LB.

The first reflection mirror 8a is disposed on the optical path of the red light LR. The first reflection mirror 8a reflects the red light LR having passed through the first dichroic mirror 7a toward the light modulator 4R for red light. The second reflection mirror 8b and the third reflection mirror 8c are disposed on the optical path of the blue light LB. The second reflection mirror 8b and the third reflection mirror 8c guide the blue light LB having passed through the second dichroic mirror 7b to the light modulator 4B for blue light. The green light LG is reflected by the second dichroic mirror 7b and travels toward the light modulator 4G for green light.

The first relay lens 9a and the second relay lens 9b are disposed on the optical path of the blue light LB and on the light exiting side of the second dichroic mirror 7b. The first relay lens 9a and the second relay lens 9b have a function of compensating light loss of the blue light LB resulting from the optical configuration in which the optical path length of the blue light LB is longer than the optical path lengths of the red light LR and the green light LG.

The light modulator 4R for red light modulates the red light LR in accordance with image information to form image light corresponding to the red light LR. The light modulator 4G for green light modulates the green light LG in accordance with the image information to form image light corresponding to the green light LG. The light modulator 4B for blue light modulates the blue light LB in accordance with the image information to form image light corresponding to the blue light LB.

Each of the light modulator 4R for red light, the light modulator 4G for green light, and the light modulator 4B for blue light is formed, for example, of a transmissive liquid crystal panel. Polarizers that are not shown are disposed on the light incident side and the light exiting side of each of the liquid crystal panels. The polarizers transmit only linearly polarized light polarized in a specific direction.

A field lens 10R is disposed on the light incident side of the light modulator 4R for red light. A field lens 10G is disposed on the light incident side of the light modulator 4G for green light. A field lens 10B is disposed on the light incident side of the light modulator 4B for blue light. The field lens 10R parallelizes the red light LR to be incident on the light modulator 4R for red light. The field lens 10G parallelizes the green light LG to be incident on the light modulator 4G for green light. The field lens 10B parallelizes the blue light LB to be incident on the light modulator 4B for blue light.

The light combining system 5 combines the image light corresponding to the red light LR, the green light LG, and the blue light LB with one another and outputs the combined image light toward the projection system 6. The light combining system 5 is formed, for example, of a cross dichroic prism.

The projection system 6 is formed of a projection lens group including a plurality of projection lenses. The projection system 6 enlarges the combined image light from the light combining system 5 and projects the enlarged image light toward the screen SCR. An enlarged color image is thus displayed on the screen SCR.

The illumination apparatus 2 will be described below.

The illumination apparatus 2 includes a light source apparatus 100, an optical integration system 25, a first wave plate 26a, a polarizing beam splitter 27, a first pickup system 28, a phosphor wheel (wavelength conversion element) 29, which includes a phosphor layer, a second wave plate 26b, a second pickup system 41, and a rotating diffusion element 42, as shown in FIG. 2. The polarizing beam splitter is hereinafter abbreviated to a PBS.

The light source apparatus 100 includes a light source unit 21, which includes a plurality of semiconductor lasers 43, the collimator system 22, and an afocal system AF. The afocal system AF, the optical integration system 25, the first wave plate 26a, the PBS 27, and the second pickup system 41 are arranged on an optical axis AX0.

The first pickup system 28 is disposed on an optical axis AX1, which is perpendicular to the optical axis AX0. Although not shown, a first reflection element 23a and a second reflection element 23b are so disposed as to sandwich the optical integration system 25 when viewed in the direction parallel to the optical axis AX0. The first reflection element 23a and the second reflection element 23b may instead be formed, for example, of a single reflection element having an opening into which the optical integration system 25 can be inserted.

The light source unit 21 includes a first light source unit 21a and a second light source unit 21b.

Each of the first light source unit 21a and the second light source unit 21b includes a plurality of the semiconductor lasers 43, each of which serves as a solid-state light source. Each of the plurality of semiconductor lasers 43 emits, for example, blue excitation light. The plurality of semiconductor lasers 43 are arranged in an array in a plane perpendicular to the optical axis AX0. FIG. 2 shows two semiconductor lasers 43 in each of the first light source unit 21a and the second light source unit 21b, four semiconductor lasers 43 in total, but the number and arrangement of the plurality of semiconductor lasers 43 are not limited to a specific number and arrangement.

The semiconductor lasers 43 in the first light source unit 21a are so arranged as to fall within the range of the first reflection element 23a when viewed in the direction parallel to the optical axis AX0. A first light beam BL1 outputted from the semiconductor lasers 43 in the first light source unit 21a is configured to be incident on the first reflection element 23a.

The semiconductor lasers 43 in the second light source unit 21b are so arranged as to fall within the range of the second reflection element 23b when viewed in the direction parallel to the optical axis AX0. A second light beam BL2 outputted from the semiconductor lasers 43 in the second light source unit 21b is configured to be incident on the second reflection element 23b.

The collimator system 22 includes a first collimator system 22a and a second collimator system 22b. Each of the first collimator system 22a and the second collimator system 22b includes a plurality of collimator lenses 44. Each of the collimator lenses 44 converts the excitation light emitted from the corresponding semiconductor laser 43 into a parallelized light beam.

The optical integration system 25 converts the intensity distribution of light having exited out of the afocal system AF, which will be described later, into a homogenous intensity distribution in the illuminated areas. The optical integration system 25 is formed, for example, of a first multiple lens array 25a and a second multiple lens array 25b.

The first wave plate 26a is, for example, a rotatable half wave plate. Since the light emitted from each of the semiconductor lasers 43 is linearly polarized light, the half wave plate set at an appropriate angle of rotation allows the light having passed through the first wave plate 26a to contain an S-polarized light component and a P-polarized light component polarized with respect to the PBS 27 at a predetermined ratio therebetween. Rotating the first wave plate 26a allows the ratio between the S-polarized light component and the P-polarized light component to be changed.

The PBS 27 is so disposed as to be inclined to the optical axis AX0 and the optical axis AX1 by 45°. The PBS 27 reflects the S-polarized light component of light incident thereon and transmits the P-polarized light component of the incident light. The S-polarized light component is reflected by the PBS 27 and directed toward a phosphor wheel 29. The P-polarized light component passes through the PBS 27 and travels toward the rotating diffusion element 42.

The S-polarized light having exited out of the PBS 27 is incident on the first pickup system 28. The first pickup system 28 focuses incident light BLs and directs the focused incident light BLs toward a phosphor layer 47 on the phosphor wheel 29. The first pickup system 28 is formed, for example, of a first pickup lens 28a and a second pickup lens 28b.

The light having exited out of the first pickup system 28 is incident on the phosphor wheel 29. The phosphor wheel 29 is what is called a reflective rotating fluorescent plate and has the phosphor layer 47, which emits fluorescence, a rotating plate 49, which supports the phosphor layer 47, a reflection film (not shown) that is provided between the phosphor layer 47 and the rotating plate 49 and reflects the fluorescence, and a drive motor 50, which drives the rotating plate 49. The rotating plate 49 is, for example, a circular plate, but the rotating plate 49 is not limited to a circular plate and may be a flat plate having any shape.

The phosphor layer 47, which contains phosphor particles that emit fluorescence, absorbs the incident light BLs (blue light), converts the blue incident light BLs into yellow fluorescence, and emits the yellow fluorescence. The phosphor particles are made of a particulate fluorescent substance that absorbs the incident light BLs and emits fluorescence. For example, the phosphor particles contain a substance that is excited by blue light having a wavelength of about 450 nm and emits fluorescence, converts the incident light BLs into yellow fluorescence, and emits the yellow fluorescence. The phosphor particles can, for example, be a YAG-based (yttrium-aluminum-garnet-based) phosphor. The phosphor particles may be made of one type of material or may be a mixture of particles made of two or more types of material.

On the other hand, P-polarized light BLp having exited out of the PBS 27 is incident on the second wave plate 26b. The second wave plate 26b is a quarter wave plate. The light BLp is converted into circularly polarized light when it passes through the second wave plate 26b. The light BLp having passed through the second wave plate 26b is incident on the second pickup system 41. The second pickup system 41 focuses the light incident thereon and directs the focused light toward the rotating diffusion element 42. The second pickup system 41 is formed, for example, of a first pickup lens 41a and a second pickup lens 41b.

The rotating diffusion element 42 includes a diffusing reflective plate 52 and a drive motor 53 for rotating the diffusing reflective plate 52. The diffusing reflective plate 52 diffuses the circularly polarized light BLp having exited out of the second pickup system 41 and reflects the diffused light toward the PBS 27. The diffusing reflective plate 52 preferably causes the light BLp incident on the diffusing reflective plate 52 to undergo Lambert reflection. The drive motor 50 has a rotating shaft disposed roughly parallel to the optical axis AX0. The diffusing reflective plate 52 is thus rotatable in a plane that intersects the optical axis of the light incident on the diffusing reflective plate 52. The diffusing reflective plate 52 is so formed as to have, for example, a circular shape when viewed in the direction of the rotating shaft, but the diffusing reflective plate 52 is not limited to a circular plate and may be a flat plate having any shape.

The circularly polarized light BLp having been reflected by the diffusing reflective plate 52 and having passed through the second pickup system 41 again passes through the second wave plate 26b again and forms S-polarized light BLp.

The yellow fluorescence emitted from the phosphor layer 47 on the phosphor wheel 29 and the light BLp (blue light) reflected by the rotating diffusion element 42 are combined with each other by the PBS 27 into the white illumination light WL. The illumination light WL is incident on the homogeneous illumination system 40 shown in FIG. 1.

The configuration of the afocal system AF will be described below.

The afocal system AF is formed of a first reflection element 23a, a third reflection element 24a, a second reflection element 23b, and a fourth reflection element 24b as shown in FIG. 2. It is assumed that the direction in which the third reflection element 24a and the fourth reflection element 24b are arranged is called an x-axis direction, that the direction parallel to the optical axis AX0 is called a y-axis direction, and that the direction perpendicular to the x axis and the y axis is called a z-axis direction. The afocal system AF can be divided into a first afocal system AF1, which is formed of the first reflection element 23a and the third reflection element 24a, and a second afocal system AF2, which is formed of the second reflection element 23b and the fourth reflection element 24b.

The first reflection element 23a is formed, for example, of a parabolic mirror, and reflects the light outputted from the first light source unit 21a (first light beam BL1). The first light beam BL1, which is parallelized by the collimator system 22, is reflected by the first reflection element 23a, and the resultant converging light beam is incident on the third reflection element 24a.

The third reflection element 24a is formed, for example, of an aspheric mirror member. The third reflection element 24a has a first curved section 61, on which the first light beam BL1 is incident. The first curved section 61 functions as a reflection surface that reflects the first light beam BL1. In the present embodiment, the first curved section 61 has a first optical axis 61a, which is located outside the third reflection element 24a and shifted away from the third reflection element 24a toward the fourth reflection element 24b. That is, the first optical axis 61 is shifted rightward from the optical axis AX0 in FIG. 2 and intersects the fourth reflection element 24b.

The first light beam BL1 reflected by the first curved section 61 has a light beam width narrowed at least in the x direction as compared with the light beam width of the light outputted from the first light source unit 21a and travels in the direction parallel to the optical axis AX0. The first afocal system AF1 is therefore a reduction-type afocal system.

In the present embodiment, the third reflection element 24a and the fourth reflection element 24b are so disposed as to be close to each other in the x direction. For example, the third reflection element 24a and the fourth reflection element 24b may be bonded to each other and hence retained in the form of an integral part or held by another member (such as frame member) with a gap between the third and fourth reflection elements.

The second reflection element 23b is formed, for example, of a parabolic mirror, and reflects the light outputted from the second light source unit 21b (second light beam BL2). The second light beam BL2, which is parallelized by the collimator system 22, is reflected by the second reflection element 23b, and the resultant converging light beam is incident on the fourth reflection element 24b.

The fourth reflection element 24b is formed, for example, of an aspheric mirror member. The fourth reflection element 24b has a second curved section 62, on which the second light beam BL2 is incident. The second curved section 62 functions as a reflection surface that reflects the second light beam BL2. In the present embodiment, the second curved section 62 has a second optical axis 62a, which is located outside the fourth reflection element 24b and shifted away from the fourth reflection element 24b toward the third reflection element 24a. That is, the second optical axis 62a is shifted leftward from the optical axis AX0 in FIG. 2 and intersects the third reflection element 24a.

The second light beam BL2 reflected by the second curved section 62 has a light beam width narrowed at least in the x direction as compared with the light beam width of the light outputted from the second light source unit 21b and travels in the direction parallel to the optical axis AX0. The second afocal system AF2 is therefore a reduction-type afocal system. The afocal system AF is therefore a reduction-type afocal system.

In the present embodiment, the first light beam BL1 reflected by the first curved section 61 and the second light beam BL2 reflected by the second curved section 62 are roughly parallel to each other and form a combined light beam BL3. The combined light beam BL3 is incident on the optical integration system 25.

The combined light beam BL3, when it is narrowed to the extent that the entire combined light beam BL3 is captured by the subsequent optical elements, can be efficiently used. Further, narrowing the combined light beam BL3 allows reduction in the sizes of the subsequent optical elements, such as the optical integration system 25, the first wave plate 26a, and the first pickup system 28.

An advantageous effect of the afocal system AF in the present embodiment will be described with reference to Comparative Example.

Figure 3:
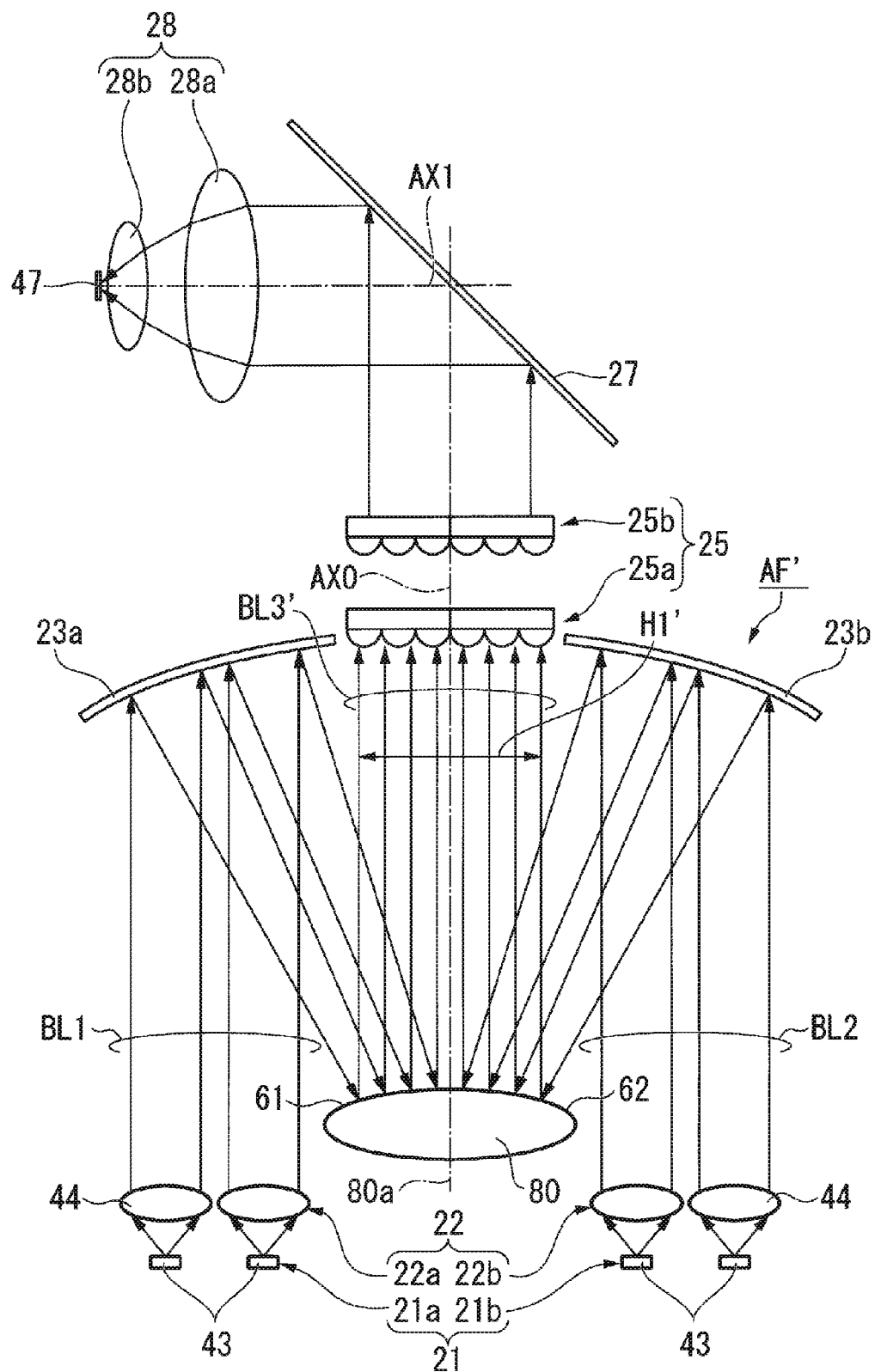
FIG. 3 shows Comparative Example in which a high afocal magnification is employed.
Figure 4:
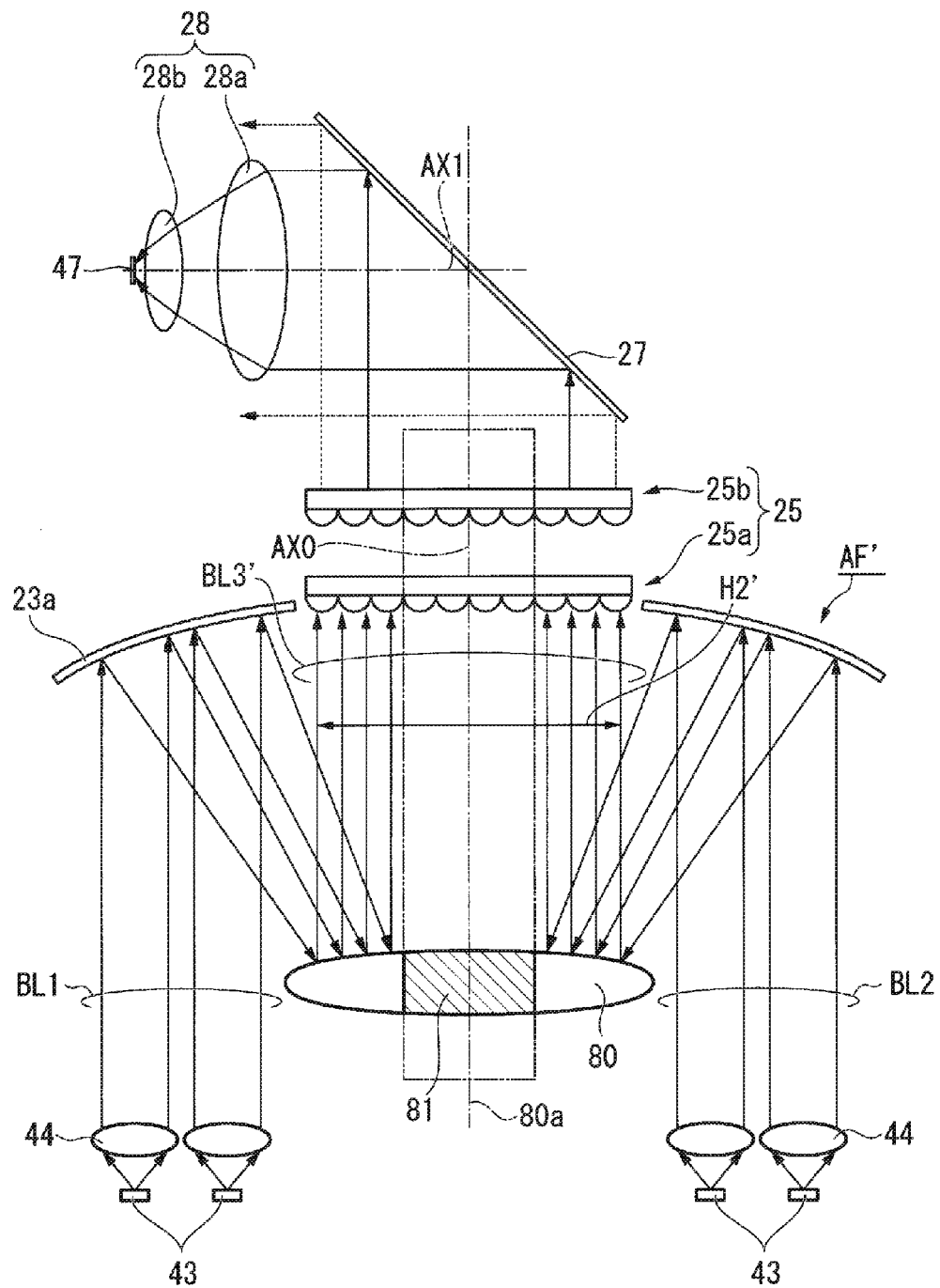
FIG. 4 shows Comparative Example in which a low afocal magnification is employed.
Figure 5:
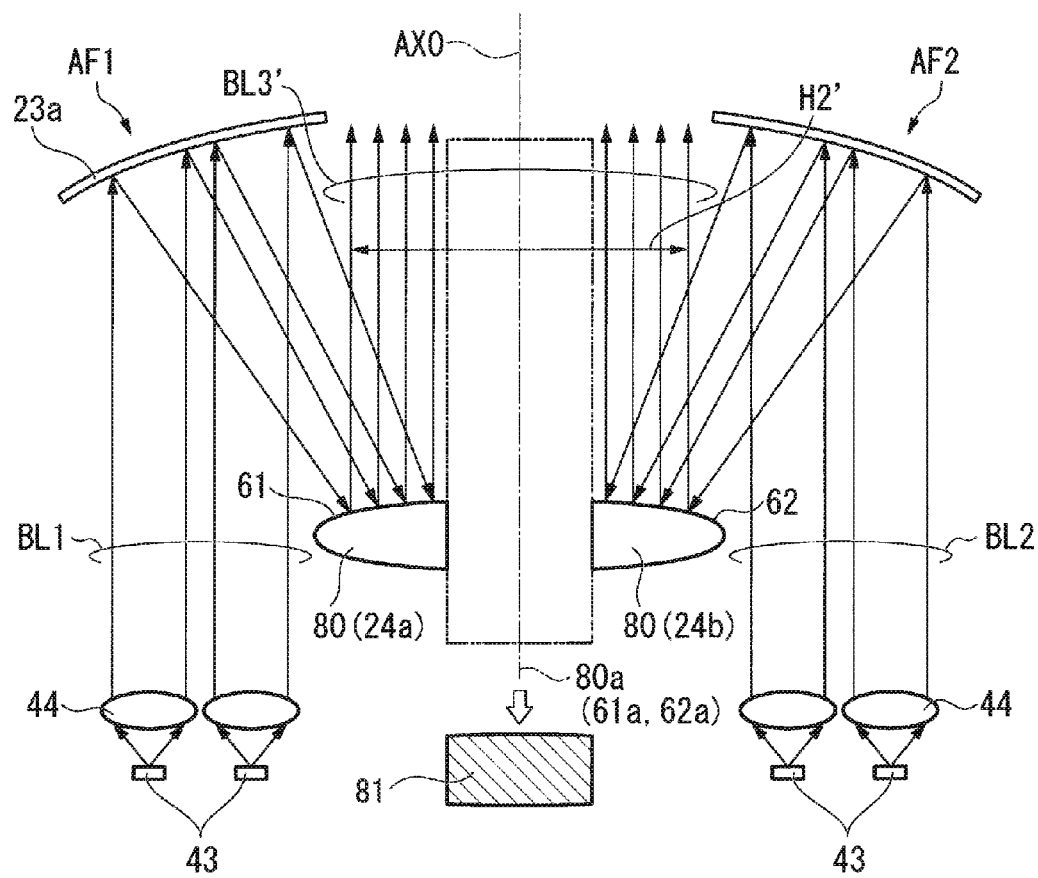
FIG. 5 describes an effect of an afocal system in the present embodiment.

FIGS. 3 and 4 each show the configuration of an afocal system AF', as Comparative Example, in which the third reflection element 24a and the fourth reflection element 24b are replaced with a single reflection element member 80. In FIGS. 3 and 4, an optical axis 80a of the reflection element member 80 coincides with the optical axis AX0 shown in FIG. 2. The first reflection element 23a and the second reflection element 23b are collectively called a reflection element 23. FIG. 5 describes an effect of the afocal system AF in the present embodiment.

In the afocal system AF', to narrow a light beam width H1' of a combined light beam BL3', which is a combination of the first light beam BL1 and the second light beam BL2 reflected by the reflection element member 80 as shown in FIG. 3, the afocal magnification of the afocal system AF' only needs to be increased. To this end, the distance between the reflection element 23 and the reflection element member 80 only needs to be increased.

When the afocal magnification is increased, however, variation in implementation of the light source unit 21 (semiconductor lasers 43) tends to affect the performance of the apparatus. That is, variation in the traveling direction of each laser beam in the combined light beam BL3' increases, and the combined light beam BL3' might not be efficiently incident on a desired area. For example, the light incident position on the phosphor layer 47 shifts, and fluorescence might not be efficiently produced. Therefore, when the afocal magnification is increased, the light source unit 21 needs to be implemented with high alignment precision.

The afocal magnification therefore needs to be lowered to some extent in consideration of variation in implementation of the light source unit 21 and other factors. In the afocal system AF', to lower the afocal magnification, the reflection element member 80 may be shifted toward the reflection element 23 with the size of the reflection element member 80 increased, as shown in FIG. 4. Lowering the afocal magnification, however, increases a light beam width H2' of the combined light beam BL3'. As a result, the amount of light components that are not captured by the subsequent optical elements increases. To avoid this, the size of each of the subsequent optical elements needs to be increased.

The light source apparatus 100 in the present embodiment, which includes the afocal system AF described above, has a small afocal magnification but can output a narrow combined light beam BL3, as will be described later.

The reflection element member 80, which forms the afocal system AF' having a small afocal magnification, has an unnecessary section 81, which is located in the vicinity of the optical axis 80a and on which neither the first light beam BL1 nor the second light beam BL2 is incident, as shown in FIG. 4. The light beam width H2' of the combined light beam BL3' therefore increases by the size of the unnecessary section 81.

The present inventor has reached an idea of removing the unnecessary section 81 described above to reduce the light beam width of the combined light beam BL3'.

The third reflection element 24a and the fourth reflection element 24b in the present embodiment are formed of two reflection elements produced by removal of the unnecessary section 81 from the reflection element member 80, as shown in FIG. 5. In other words, the first curved section 61 has a structure in which a reflection surface that can form, along with the reflection element 23, an afocal system having a relatively small afocal magnification is halved at a plane containing the optical axis and an unnecessary section in the vicinity of the optical axis is removed from one of the halved members. The second curved section 62 has the same structure as that of the first curved section 61.

The first optical axis 61a of the first curved section 61 in the third reflection element 24a and the second optical axis 62a of the second curved section 62 in the fourth reflection element 24b correspond to the optical axis 80a of the reflection element member 80 before the removal of the unnecessary section 81.

The first optical axis 61a is therefore located outside the third reflection element 24a. The second optical axis 62a is similarly located outside the fourth reflection element 24b.

Since the unnecessary section 81 is a section that does not contribute to the reflection of the first light beam BL1 or the second light beam BL2, removal of the unnecessary section 81 does not affect the parallelism or the reduction factor of the combined light beam BL3.

Figure 6:
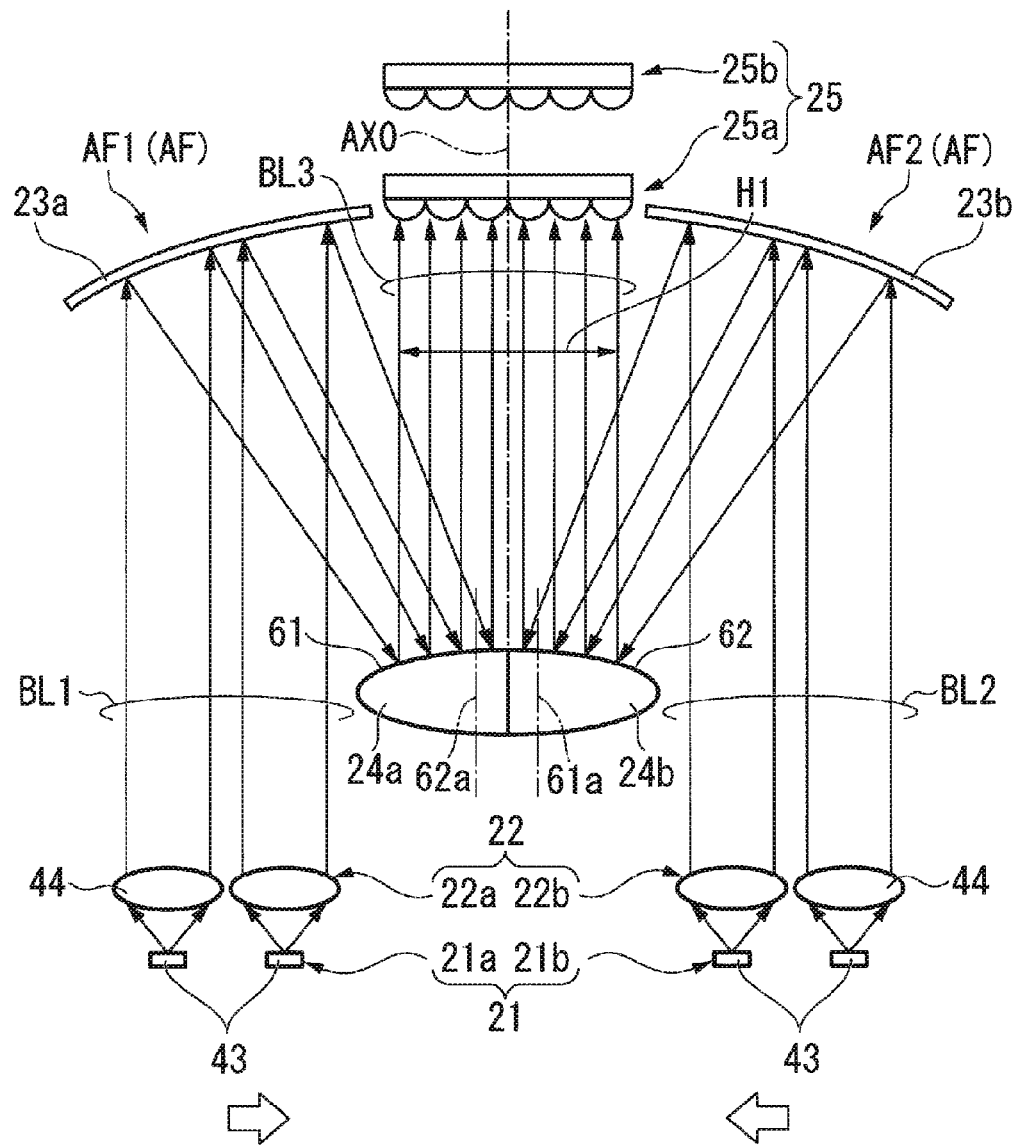
FIG. 6 describes the effect of the afocal system in the present embodiment.

The first afocal system AF1 and the second afocal system AF2 are so shifted as to approach the optical axis AX0 and occupy the space created by the removal of the unnecessary section 81 without any change in the distance between the first reflection element 23a and the third reflection element 24a and the distance between the second reflection element 23b and the fourth reflection element 24b, that is, without any change in the afocal magnification, as shown in FIG. 6.

In the first afocal system AF1, the components thereof (first light source unit 21a, first collimator system 22a, first reflection element 23a, and third reflection element 24a) are shifted as an integral part toward the optical axis AX0 (in +x direction). Similarly, in the second afocal system AF2, the components thereof (second light source unit 21b, second collimator system 22b, second reflection element 23b, and fourth reflection element 24b) are shifted as an integral part toward the optical axis AX0 (in −x direction).

Therefore, the first optical axis 61a intersects the fourth reflection element 24b, and the second optical axis 62a intersects the third reflection element 24a. The size of the light source apparatus 100 can thus be reduced.

The thus configured light source apparatus 100 has a low afocal magnification but allows a light beam width H1 of the combined light beam BL3 (see FIG. 2) to be reduced to a value as small as the light beam width H1' in Comparative Example shown in FIG. 3, in which a high afocal magnification is employed. The size of each of the subsequent optical elements, such as the optical integration system 25, the first wave plate 26a, and the first pickup system 28, can therefore be reduced with loss of the combined light beam BL3 suppressed. The sizes of the illuminator 2 and the projector 1 can be reduced accordingly.

The invention is not necessarily limited to the embodiment described above, and a variety of changes can be made thereto to the extent that the changes do not depart from the substance of the invention.

For example, at least one of the third reflection element 24a and the fourth reflection element 24b may include part of the unnecessary section 81.

For example, when the fourth reflection element 24b contains the second optical axis 62a, the first optical axis 61a only needs to be located in the fourth reflection element 24b.

That is, in FIG. 2, when the light source apparatus 100 is viewed in the direction parallel to the z axis, the first curved section 61 and the second curved section 62 may be so arranged that the first optical axis 61a of the first curved section 61 located on the left is located on the right of the second optical axis 62a of the second curved section 62 located on the right.

In the embodiment described above, the projector 1 including the three liquid crystal light modulator 4R, 4G, and 4B is presented by way of example. Instead, the invention is also applicable to a projector that uses a single liquid crystal light modulator to display color video images. Further, a digital mirror device may be used as each of the light modulators.

Further, the above embodiment has been described with reference to the case where the illumination apparatus according to the embodiment of the invention is incorporated in a projector, but the invention is not necessarily configured this way. The illuminator according to the embodiment of the invention may be used as a lighting apparatus, a headlight of an automobile, and other components.

The entire disclosure of Japanese Patent Application No. 2015-039845, filed on Mar. 2, 2015 is expressly incorporated by reference herein.

What is claimed is:

1. A light source apparatus comprising:
a first light source unit;
a second light source unit;
a first reflection element on which a first light beam outputted from the first light source unit is incident;
a second reflection element on which a second light beam outputted from the second light source unit is incident;
a third reflection element having a first curved section on which the first light beam reflected by the first reflection element is incident; and
a fourth reflection element having a second curved section on which the second light beam reflected by the second reflection element is incident,
wherein the first curved section has a first optical axis that is located outside the third reflection element and shifted away from the third reflection element toward the fourth reflection element, and
the first light beam reflected by the first curved section is roughly parallel to the second light beam reflected by the second curved section.

2. The light source apparatus according to claim 1, wherein the first optical axis intersects the fourth reflection element.

3. An illuminator comprising:
the light source apparatus according to claim 2;
a wavelength conversion element; and
a light guide system that guides at least part of the first light beam and the second light beam to the wavelength conversion element.

4. A projector comprising:
the illuminator according to claim 3;
a light modulator that modulates light outputted from the illuminator in accordance with image information to form image light; and
a projection system that projects the image light.

5. The light source apparatus according to claim 1, wherein the second curved section has a second optical axis that is located outside the fourth reflection element and shifted away from the fourth reflection element toward the third reflection element.

6. An illuminator comprising:
the light source apparatus according to claim 5;
a wavelength conversion element; and
a light guide system that guides at least part of the first light beam and the second light beam to the wavelength conversion element.

7. A projector comprising:
the illuminator according to claim 6;
a light modulator that modulates light outputted from the illuminator in accordance with image information to form image light; and
a projection system that projects the image light.

8. The light source apparatus according to claim 1, wherein the second optical axis intersects the third reflection element.

9. An illuminator comprising:
the light source apparatus according to claim 8;
a wavelength conversion element; and
a light guide system that guides at least part of the first light beam and the second light beam to the wavelength conversion element.

10. A projector comprising:
the illuminator according to claim 9;
a light modulator that modulates light outputted from the illuminator in accordance with image information to form image light; and
a projection system that projects the image light.

11. An illuminator comprising:
the light source apparatus according to claim 1;
a wavelength conversion element; and
a light guide system that guides at least part of the first light beam and the second light beam to the wavelength conversion element.

12. A projector comprising:
the illuminator according to claim 11;
a light modulator that modulates light outputted from the illuminator in accordance with image information to form image light; and
a projection system that projects the image light.

13. The light source apparatus according to claim 1, wherein the third reflection element includes an aspheric mirror.

14. The light source apparatus according to claim 1, wherein the first curved section includes a convex surface.

15. An illuminator comprising:
the light source apparatus according to claim 14;
a wavelength conversion element; and
a light guide system that guides at least part of the first light beam and the second light beam to the wavelength conversion element.

16. A projector comprising:
the illuminator according to claim 15;
a light modulator that modulates light outputted from the illuminator in accordance with image information to form image light; and
a projection system that projects the image light.

17. The light source apparatus according to claim 1, wherein the fourth reflection element includes an aspheric mirror.

18. The light source apparatus according to claim 1, wherein the second curved section includes a convex surface.

19. An illuminator comprising:
the light source apparatus according to claim 18;
a wavelength conversion element; and
a light guide system that guides at least part of the first light beam and the second light beam to the wavelength conversion element.

20. A projector comprising:
the illuminator according to claim 19;
a light modulator that modulates light outputted from the illuminator in accordance with image information to form image light; and
a projection system that projects the image light.

* * * * *